Sept. 8, 1959     T. T. BUNCH     2,902,883
APPARATUS FOR AUTOMATICALLY BALANCING ROTATING MASSES
Filed July 3, 1957     2 Sheets-Sheet 1

INVENTOR.
T. T. BUNCH
BY A.C. Schwarz, Jr.
ATTORNEY

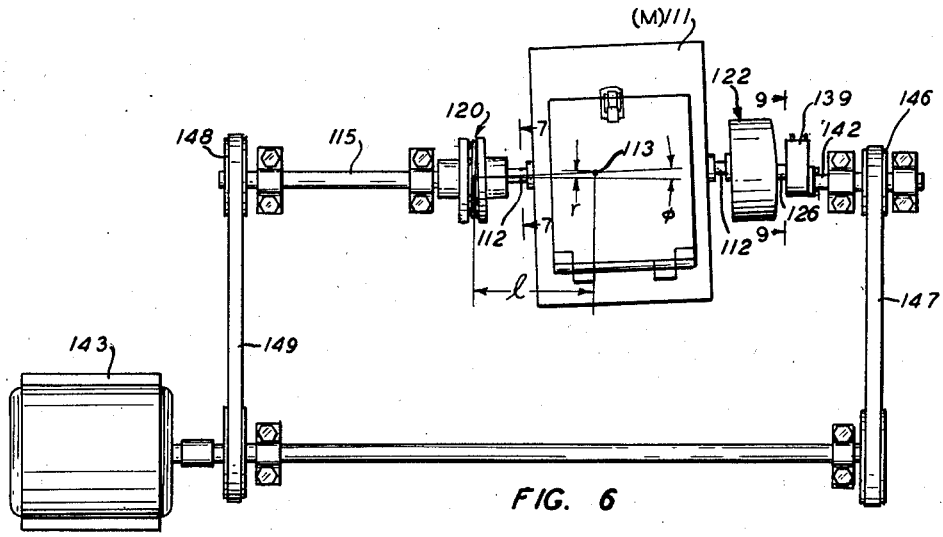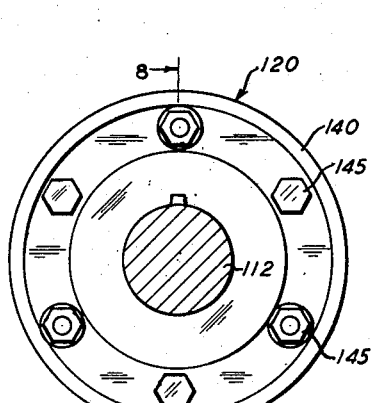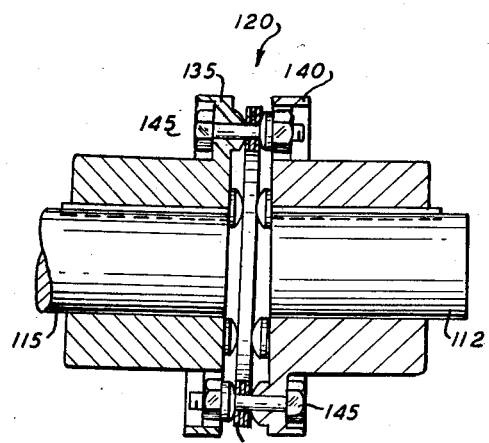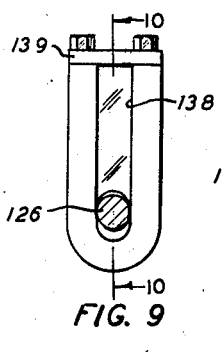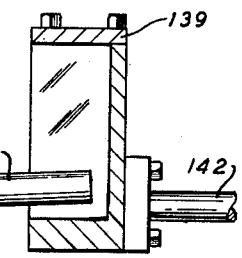

United States Patent Office 2,902,883
Patented Sept. 8, 1959

2,902,883
APPARATUS FOR AUTOMATICALLY BALANCING ROTATING MASSES

Tillman T. Bunch, Baltimore, Md., assignor to Western Electric Company, Incorporated, New York, N.Y., a corporation of New York Application July 3, 1957, Serial No. 669,838

8 Claims. (Cl. 74—573)

This invention relates to automatic balancing drive means operating such drive means, and more particularly, although not exclusively, to means for rotating and balancing a load-bearing system having a center of gravity displaced initially from a predetermined desired axis of rotation which may be a horizontal axis.

One of the most important applications of the theory of vibrations is in the solution of balancing problems. It is known that a rotating rigid body does not exert any variable disturbing action on supports when the axis of rotation coincides with a principal axis of inertia of the body. However, it is difficult to satisfy these conditions exactly when it is necessary to rotate loads consisting of materials being processed in the course of manufacture, or in the course of cleaning or testing because variations in geometrical dimensions and non-homogenity of materials virtually always are present to cause some irregularity in the distribution of the mass.

Further, many machines are required to rotate loads where the location of the center of gravity is not known or may shift, as in the case of laundry centrifuges. As a result of this, large periodic disturbing forces which produce vibrations are likely to be present. In order to avert the occurrence of such vibrations in machines and establish quiet running conditions, balancing means are necessary, especially in the case of massive, high speed apparatus.

In most self-balancing apparatus, compensating movement of the load or correcting means occurs only at or above the first critical speed which is a speed of a relatively high value. However, apparatus utilizing the present invention may be constructed in which the load-bearing system is urged to shift its center of gravity to correct any eccentric rotation thereof at any rotational speed above zero including rotational speeds of relatively low value.

The self-balancing arbors of the present invention are susceptible of many applications but are herein described as being applicable particularly to rotatable arbors driven through a balancing drive designed to establish precession of the arbors in a predetermined manner. The manner of establishing precession of the arbors is calculated to have the optimum effect tending to compensate for any possible eccentricitiy of the center of gravity of the load, with respect to the geometrical axis of the arbor, by establishing a rotational axis which passes through the center of gravity. The established axis of rotation is independent of the geometrical axis or axis of symmetry, whether the load is mounted adjacent to the end of a cantilever-type arbor or the load is mounted intermediate of the ends of a simple-shaft-type arbor which is supported at both ends thereof.

A cantilever-type arbor which may be constructed in accordance with the present invention may be mounted rotatably and pivotably intermediate of the ends thereof either in bearings supported in a gyroscope-type mounting or in a pillow-block having a bearing provided with a spherical inner race. In either construction the end of the shaft opposite the free, cantilevered end, forming the arbor is engaged with a crank arm of a drive shaft by means of a transversely slidable stub extension.

One simple-shaft-type arbor in which both ends thereof are supported, which may be constructed in accordance with the teaching of the present invention may be supported at one end by an angularly flexible coupling member on which it pivots and at the other end by a transversely slidable stub extension movably engaging a crank arm of a driven shaft which rotates on a fixed axis. The point about which the arbor axis pivots is established so that it coincides with some point in the rotational axis of the crank arm of the drive shaft.

As the arbor in either of the above-described embodiments is driven rotatably about an axis, the arbor, if the center of gravity moves eccentrically, is driven also in precessional movement in some predetermined manner by its engagement with the rotating crank arm of the drive shaft. In this manner the arbor is caused to pivot its axis and to gyrate about the axis upon which the arbor normally would rotate if the center of gravity of the load-bearing system were in the predetermined axis of rotation of the crank arm of said drive shaft.

In accordance with the physical laws relating to gyroscopic action, a natural precessional movement gives rise to a restoring force coincident therewith which tends to urge the rotational axis of the load and the containing structure toward a position wherein their center of gravity lies in the axis of gyration of the precession.

An object of the present invention is to provide means for compensating for unbalance in a rotating mass which may result from the center of gravity of the load being removed from the axis of rotation thereof, and to establish a rotational axis which passes through the center of gravity of the load.

It is another object of the present invention to provide an automatic balancing drive means for unbalanced loads supported either from one end or from both ends thereof which causes the position of the center of gravity of the total mass rotated to be made to coincide with an axis of rotation thereof, which axis is identical with the axis of rotation of the drive means.

Another object of the present invention is to provide a self-balancing arbor in which the load is caused to precess to adjust for any unbalance thereof, if not at any speed, at any speed above a relatively slow speed.

Other objects and features of the present invention will be more readily understood from the following detailed description, when read in conjunction with the accompanying drawings in which:

Fig. 6 is a top plan view illustrating an alternate embodiment of the automatic balancing drive means embodying the invention;

Fig. 7 is an enlarged, cross-sectional view of a portion of the apparatus taken along line 7—7 of Fig. 6;

Fig. 8 is a fragmental, cross-sectional view of a portion of the apparatus taken along line 8—8 of Fig. 7;

Fig. 9 is an enlarged, cross-sectional view of a portion of the apparatus taken along line 9—9 of Fig. 6, and Fig. 10 is a fragmental, cross-sectional view of a portion of the apparatus taken along line 10—10 of Fig. 9.

Figure 1:
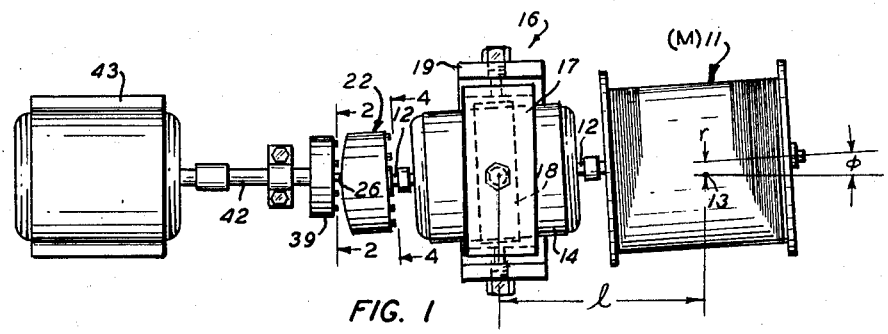
Fig. 1 is a top plan view illustrating one embodiment of the automatic balancing drive means embodying the invention.

Referring now to the drawings wherein like numerals designate the same or similar elements throughout the various views, there is shown in Fig. 1, a load-bearing system, designated generally by the numeral 11, having a substantially cylindrical load as a portion thereof. The load may be of any configuration desirable but is herein depicted as a reel of strand material mounted adjacent to one end of a rotatably driven shaft or arbor 12. The mass of the load-bearing system 11 is indicated as M. The center of gravity of the load-bearing system 11 is indicated by the numeral 13 and may be displaced from the axis of symmetry of the shaft 12 by a distance r.

The load shaft could have a sheave driven by a belt from a driving sheave and motor and could be mounted so that the axis thereof would have universal freedom to pivot about a fixed point as the load rotates. This freedom could be achieved by mounting the sheave with its pitch surface centered with the aligning center of a self-aligning bearing comprising a frictionless bearing having a spherical inner race supported in a pillow block. The spherical inner race of the bearing block would serve not only as a bearing but also as a fulcrum about which the axis of the load shaft could pivot.

However, the arbor 12 and a motor 14 are herein represented as having a regular gyroscopic mounting, designated generally by the numeral 16, wherein the motor 14 is mounted in a plurality of pivoted frames 17 and 18 called gimbal rings which are in turn mounted in a bifurcated support 19. The axis of the outer gimbal ring 17 is horizontal and the axis of the inner gimbal ring 18, in which the stator of the motor 14 is secured rigidly and in which the rotor of the motor 14, the arbor 12 and load form the load-bearing system 11 which essentially is a gyrostat which is mounted rotatably, is vertical.

Figures 4, 5:
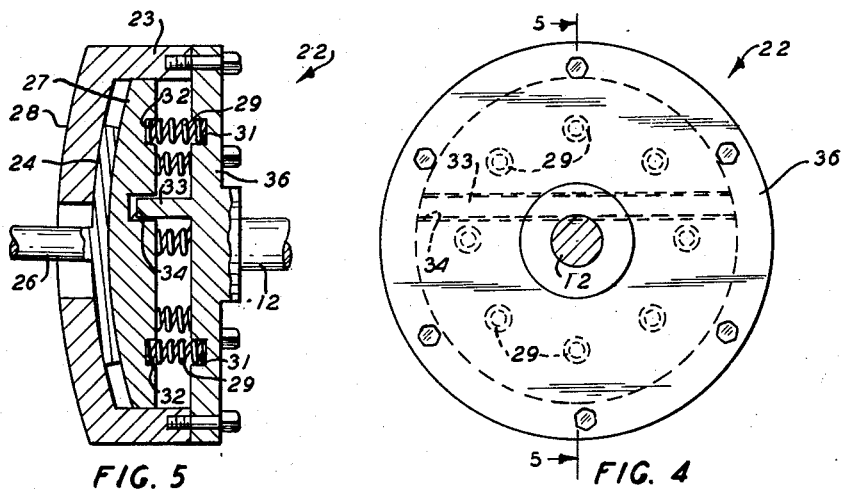
Fig. 4 is an enlarged, cross-sectional view of a portion of the apparatus taken along line 4—4 of Fig. 1.
Fig. 5 is a fragmental, cross-sectional view of a portion of the apparatus taken along line 5—5 of Fig. 4.

The other end of the shaft or arbor 12 is secured to a pressure plate assembly, designated generally by the numeral 22, which is provided with a housing 23 (Fig. 5) to house a slidable friction disc 24 having a stub shaft 26 which serves both as a crank pin and as a support for the load shaft or arbor 12. The friction disc 24, the shape of which is that of hollow, spherical segment, whose center of curvature coincides with the pivotal center of the arbor 12, is positioned within the housing 23 between a pressure plate 27 of a convex complementary shape and a corresponding concave covering 28 affixed to and forming one end of the housing member 23.

Figures 2, 3:
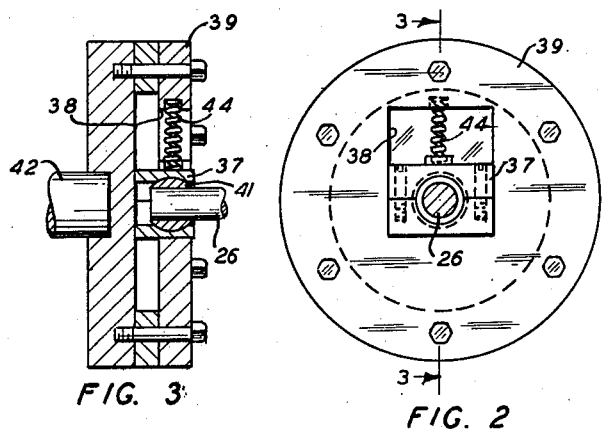
Fig. 2 is an enlarged, cross-sectional view of a portion of the apparatus taken along line 2—2 of Fig. 1.
Fig. 3 is a fragmental, cross-sectional view of a portion of the apparatus taken along line 3—3 of Fig. 2.

The pressure plate 27 is urged against the friction disc 24 by a plurality of compression springs 29—29. The friction disc 24 in turn bears against a curved portion 28 of the housing 23. In order to preserve the alignment of recesses 31—31 and 32—32 in which the compression springs 29—29 are mounted in the housing 23 and pressure plate 27 respectively, the pressure plate 27 is keyed to the housing 23 and thus to the load shaft 12, to prevent relative rotational movement therebetween, by means of a key 33 having a rectangular cross section which projects into a rectangular slot 34 in the pressure plate 27. The projecting key 33 forms a portion of a circular collar 36 which is an integral part of the load shaft 12 and the housing 23. The friction disc 24 is integral with one end of a stub shaft 26. The other end of the stub shaft 26 is mounted pivotably, rotatably and slidably in a block member 37 (Figs. 2 and 3), which in turn, is received slidably within a slot 38 formed in a crank arm 39 by means of a substantially spherical bearing member 41.

The slotted crank arm 39 is mounted on a crank shaft 42 which is driven by an electric motor 43. The stub shaft 26 maintains its axis substantially parallel to that of the crank shaft 42 and is urged by means of a compression spring 44 toward an end of the crank slot 38, which lies on the axis of the crank shaft 42. The force exerted by the spring 44 is sufficient to support the loading of the arbor 12 due to gravity.

The load-bearing system 11, comprising the arbor 12, the rotor of the motor 14, and any load, form a composite spinning body or gyrostat which is mounted on the gyroscopic mounting 16 so that its axis has universal freedom to pivot thereabout which will result in the spinning load-bearing system 11 maintaining its axis of spin pointed in a fixed direction in space unless acted upon by a torque couple between an external force and its pivotal mounting 16. Such an external force develops between the spinning system 11 and its supports 16, when the body is constrained to rotate in an axis about which it is unbalanced as may be the initial condition for the apparatus covered by this invention.

It should be noted that the axis of a spinning body takes on a considerable degree of stability in that it offers resistance to change in direction, reacting when changes do take place. While it might be expected that under the influence of gravity the end of a horizontal shaft supporting the load forming the spinning body would tend to fall straight down, actually it will tend to immediately start to pivot about a vertical axis instead, and if it is permitted to pivot freely, its fall tends to be arrested. Any pivoting of the axis of spin of a body will establish immediately a reaction torque on an axis at right angles to the axis of the initial movement, and to the axis of spin.

A changing direction of the axis of spin is known as precession. A spinning object precesses naturally in equilibrium at a tangential rate proportional to (a) the torque applied, (b) the displacement of the center of mass from the pivotal axis, and (c) the rotational momentum possessed, and about an axis at right angles to the axis of the torque.

At some point during each revolution, the force resulting from the unbalanced rotation of the system 11, the weight of the system 11, and the precession is a maximum, and at another point during each revolution the force is a minimum. Therefore, the motion of the stub shaft 26, when it is situated eccentrically in the slot 38 in the crank arm 39, will cause a strong force on the material forming the crank slot 38 in the crank arm 39 resulting from the gyroscopic motion. The particular portion of the material forming the slot 38 on which the resultant force will act depends on the direction of spin and effective position on which the resultant force is applied.

If a force is applied on the side of a rotating shaft or member, the reactive force will be in a direction opposite to the movement of the material in the section of the rotating member against which the effective force is applied. That is to say that if a shaft is rotating in a clockwise direction and force is applied to the lefthand side of the shaft, the precession will be in a downwardly direction, and if the force is applied on the righthand side of a shaft rotating in a clockwise direction, the precession will be in an upwardly direction.

The gyroscopic reactive force will have a magnitude which is proportional to the spinning velocity and also to the velocity of precession of the system 11 caused by the crank arm 39. The end of the stub shaft 26, which always is urged to move at right angles to any force resulting from the unbalance of the load, can move only if the slot 38 in the crank arm 39, which is of substantially the same width as the width of the block member 37 supporting the stub shaft 26, is oriented in a direction having a component in the same direction as that in which the stub shaft 26 is urged.

If the crank arm 39 is revolved faster than the arbor 12 is tending to precess naturally on that axis, the stub shaft 26 will tend to move toward the axis of rotation of the crank shaft 42 and if the crank arm 39 is revolved slower than the arbor 12 is tending to precess naturally on that axis, the stub shaft 26 will tend to move outwardly in the slot 38. Therefore, in order to overcome movement outwardly of the stub shaft 26 in the crank slot 38 resulting from the unbalanced centrifugal force on the system 11, the crank shaft 42 is caused to rotate at an angular velocity greater than the speed at which the arbor 12 tends to precess naturally in order that the crank arm 39 will tend to cause the stub shaft 26 to move into alignment with the axis of rotation of the crank shaft 42.

The stub shaft 26 will tend to move outwardly in the slot 38 as a result of the unbalanced centrifugal force of the system 11 tending to be thrown outwardly thereby. The stub shaft 26 will tend also to move outwardly when the slot 38 is extending vertically upward, as a result of the gravitational force on the system 11. However, the stub shaft 26 actually will move reciprocably in the crank slot 38 in response to the above-described forces and to the forces resulting from the crank arm 39 moving faster than the shaft 26 tends to precess naturally and because the stub shaft 26 seeks to cross the axis of revolution, there will be, in effect, a hammering of the stub shaft 26 and block member 37 on the inner end of the slot 38 which will tend to shift the friction disc 24 into the proper alignment with respect to the housing 23 and thus the arbor 12 to cause balancing of the entire load-bearing system 11.

The path of precession of the stub shaft 26 about the axis of rotation of the crank shaft 42 neither is reentrant to form a simple vertical circle nor does it form a simple vertical spiral. Rather, it will tend to form a complicated rotational path as a result of the movement of the stub shaft 26 back and forth in the slot 38 in the crank arm 39.

Operation

For the purpose of facilitating a description of the operation of the above-described apparatus, it will be assumed that the load shaft or arbor 12 is rotated on its own axis at an angular spin velocity of $\omega$ in radians per second. It will be assumed that the free end of the axis of the arbor 12 is revolved with respect to the axis of the crank shaft 42 or axis of revolution at an angular velocity $\psi$, in radians per second. The angle between the axis of revolution of $\psi$ and the axis of rotation of the system 11 having the mass M is defined as $\phi$. The maximum magnitude of $\phi$ is limited physically by the length of the slot 38 in the crank arm 39 and movement of the friction disc 24 within the housing 23.

The distance at which the center of gravity of the rotating mass M is removed from the pivotal point of the arbor 12 is defined as $l$, which will remain constant unless the load shifts within whatever limits the container allows. K is defined as the radius of gyration of the rotating mass M, referred to an axis through its center of gravity 13 and the pivotal point of the arbor 12 and will remain constant unless the distribution of the rotated mass M shifts, and, moreover, the possible extent of such shifting is limited by the dimensions of the container or vessel confining the load.

The rate of change of the direction of the vector quantity of the angular spin velocity $\omega$ is equal to a vector quantity of angular velocity $\omega'$. The centrifugal force will be equal to $M\psi^2 l \sin \phi$. The centripetal force will be equal to $$MK^2\omega \frac{(\omega')}{l \cos \phi}$$

where $\psi \sin \phi$ is equal to the angular velocity $\omega'$. Therefore, the centripetal force is equal to $$\frac{MK^2\omega\psi \sin \phi}{l \cos \phi}$$

Noting that the restoring force F which is the net force tending to cause the center of gravity 13 of the mass 11 to seek the axis of rotation of the crank shaft 42, is equal to the centripetal force less the centrifugal force, then $$F = \frac{MK^2\omega(\psi \sin \phi)}{l \cos \phi} - (M\psi^2 l \sin \phi)$$

In order to determine the velocity of rotation $\psi$ of the crank shaft 42, in radians per second, at which F is a maximum, so that the apparatus may be designed for and be operated under optimum conditions, it is necessary to find the angular velocity $\psi$ at which the force F will be a maximum.

By partial differentiation:

$$\frac{\delta F}{\delta \psi} = \frac{MK^2\omega \sin \phi}{l \cos \phi} - 2M\psi l \sin \phi$$

By equating the partial derivative to zero and solving it, it is found that the restoring force F is a maximum for an optimum angular velocity of revolution $\psi$ equal in value to $$\frac{\omega K^2}{2 \cos \phi l^2}$$

Therefore, for restoring the apparatus to balance, the best angular rate for rotating the crank shaft 42 is where $\psi$ is equal to $$\frac{\omega K^2}{2 \cos l^2}$$

which means $$\frac{\psi}{\omega} = \frac{K^2}{2 \cos l^2}$$

From the above equations the optimum value of the precessional velocity for any single condition of rotation and deflection may be computed, and further, by suitable control of the motors 14 and 43, it is possible to cause the rate of precession to vary in such a fashion as to be optimum irrespective of changes of the conditions of rotation and deflection.

Alternative embodiment

An alternative embodiment of the present invention is illustrated in Fig. 6. In this embodiment, a load-bearing system 111, which may include a tub of a washing machine, a centrifuge or any other desirable device, includes and is mounted on a load shaft 112. It is obvious that the load shaft 112 may consist of two stub shafts with the load supported therebetween. The center of gravity 113 of the system 111 is indicated as and is displaced from the physical axis of the cylinder by a distance $r$. The shaft 112 is supported at one end by a rotatably mounted shaft 115 through a flexible coupling, designated generally by the numeral 120, which may be of a type which may be procured from the Thomas Flexible Coupling Company, Warren, Pennsylvania.

This type of coupling 120 is of single engagement construction, is self-aligning and is self-supporting. It permits limited angular misalignment of the members which it connects but will not permit any radial or axial misalignment. The coupling 120 allows for angular deflection by a slight bending of a laminated flexible annular ring 130 (Fig. 8), which is fastened alternately to one or the other of the end flanges 135 and 140 by bolt means 145, thereby preventing any relative rotation of one end flange 135 with respect to the other flange 140.

The other end of the load shaft 112 is supported in a friction disc assembly, designated generally by the numeral 122, similar to that shown in Fig. 1 except that the springs urging the plate toward the disc which, in turn, urges the disc against the housing of the assembly 122 are of sufficient strength to prevent the friction disc from moving with respect to the pressure plate and housing as a result of the gravitational force on the load 111 and the spring for the stub shaft 126 is omitted as will be explained later.

The friction disc in the assembly 122 is secured fixedly to one end of a stub shaft 126, the other end of which is received slidably within a slot 138 (Figs. 9 and 10) formed in a crank arm 139 similar to the crank arm 39. The crank arm 139 is mounted eccentrically with respect to a crank shaft 142 and is on one end of the crank shaft, which is driven by a pulley 146 through a drive belt 147 connected operatively to an electric drive motor 143. The stub shaft 126 need not be and is not urged toward the inner end of the slot 138 by a compression spring such as the spring 44 as was done in the case of the crank arm 39, since the load probably will not assume a stable portion until some measure of speed is attained. The gravitational force on the system 111 is overmatched by the use of the compression springs in the assembly 122 which are of sufficient strength to prevent the friction disc from sliding between the end of the housing and the pressure plate solely as a result of the gravitational force on the load system 111 while the apparatus is in the unoperated condition or the operated condition.

The electric motor 143 drives also a pulley 148 keyed to the shaft 115 by means of a drive belt 149 connected operatively thereto. The crank shaft 142 is revolved at a higher angular velocity than the load system 111 tends to precess naturally, which tends to cause the stub shaft 126 to be positioned in axial alignment with the crank shaft 142 as explained previously.

It is quite obvious that two separate motors could be provided to drive the load shaft 112 and the crank shaft 142 as was the case in the above-explained embodiment, and that variant crank means could be employed.

Operation of alternative embodiment

For the purpose of facilitating a description of the operation of the above-described alternative embodiment, it will be assumed that the load shaft or arbor 112 is rotated on its own axis at an angular spin velocity of $\omega$, in radians per second. It will be assumed that every point on the axis of the arbor 112 is revolved with respect to the axis of the crank shaft 142 or axis of revolution at an angular velocity of $\psi$, in radians per second. With the above-described construction, the sum of the angular spin velocity $\omega$, in radians per second, and the angular rotational velocity $\psi$, in radians per second, will be equal to a rotational velocity $C$ of the drive shaft 115.

The angle between the axis of revolution of $\psi$ and the axis of rotation of M is defined as $\phi$. The magnitude of $\phi$ is limited by the length of the slot 138 in the crank arm 139 and movement of the friction disc within the housing of the assembly 122. The distance at which the center of gravity 113 of the rotating load system 111 of mass M is removed from the pivotal point of the load shaft 112, which is in the center of the coupling 120, is defined as $l$. The distance $l$ will remain constant unless the load in the system 111 shifts within whatever limits the container allows. K is defined as the radius of gyration of the rotating mass M referred to an axis taken through its center of gravity 113 and the pivotal point of the arbor 112 and will remain constant unless distribution of the rotated mass M shifts; however, such shifting is limited by the container or vessel confining the load.

The rate of change of the direction of the vector quantity $\omega$ which is the angular velocity of spin is equal to the angular velocity $\omega'$. The centrifugal force will be equal to $M\psi^2 l \sin \phi$. The centripetal force will be equal to $$\frac{MK^2\omega(\omega')}{l \cos \phi}$$

where $\psi \sin \phi$ is equal to the angular velocity $\omega'$. Therefore, the centripetal force is equal to $$\frac{MK^2\omega\psi \sin \phi}{l \cos \phi}$$

Noting that the restoring force F, which is the net force tending to cause the center of gravity 113 of the mass 111 to seek the axis of rotation of the crank shaft 142, is equal to the centripetal force less the centrifugal force, it will be seen that $$F = \frac{MK^2\omega\psi \sin \phi}{l \cos \phi} - (M\psi^2 l \sin \phi)$$

In order to determine the velocity of rotation $\psi$ of the crank shaft 142, in radians per second, at which F is a maximum so that the apparatus may be designed for and be operated under optimum conditions, it is necessary to find the angular velocity $\psi$ at which the force F will be a maximum by substituting $C-\psi$ for $\omega$ and determining where the rate of change of force F with respect to angular rotational velocity $\psi$ is equal to zero.

By partial differentiation:

$$\frac{\delta F}{\delta \psi} = \frac{M}{l}[K^2 C \tan \phi - 2\psi(K^2 \tan \phi + l^2 \sin \phi)]$$

By equating the partial derivative to zero and solving it, it is found that the restoring force F is a maximum for an optimum angular velocity of revolutions $\psi$ equal in value to $$\frac{K^2 C}{2(K^2 + l^2 \cos \phi)}$$

Therefore, for restoring the apparatus to balance, the best angular rate for rotating the crank shaft 142 is where $\psi$ is equal to $$\frac{K^2 C}{2(K^2 + l^2 \cos \phi)}$$

which will make the maximum restoring force F equal to $$\frac{MK^4 C^2 \tan \phi}{4l(r^2 + l^2 \cos \phi)}$$

From the above equation the optimum value of precessional velocity for any single condition of rotation and deflection may be computed, and further by suitable control of the motor 143 and of the size of the pulleys 146 and 148 of the drive system it is possible to cause the rate of precession to vary in such a fashion as to be optimum irrespective of changes of conditions of rotation and deflection.

In determining the restoring force F in terms of a function of the angle $\phi$ for a specific embodiment, operating under the following conditions, where $C = 106$ radians per second
$r^2 = 0.78$ ft.$^2$
$M = 30$ slugs
$l = 1.563$ ft.
$l^2 = 2.44$ ft.$^2$ $$F = \frac{205{,}000 \tan \alpha}{4.87 + 15.2 \cos \alpha}$$

and, therefore, the specific apparatus would need to be revolved at an angle of deflection of approximately 5.6° to develop a restoring force equal to the force of gravity on the mass M, to take the place of the force provided by the spring 44 of the first described embodiment.

It is to be understood that the above-described arrangements are simply illustrative of the principles of the invention. Other arrangements may be devised by those skilled in the art, which embody the principles of the invention and fall within the spirit and scope thereof.

What is claimed is:

1. Automatic balancing drive means for rotating an unbalanced load, which comprises a pivotably and rotatably mounted mass having the center of gravity removed from an axis of rotation thereof, a drive shaft, a flexible coupling secured rigidly to said drive shaft for supporting one end of said mass and permitting said mass to pivot with respect to said drive shaft, means for driving said drive shaft and said flexible coupling at a predetermined angular velocity, a segmental, spherically shaped friction disc secured slidably to said mass and having a center of curvature which coincides with the pivotal center of said mass within said flexible coupling, a slotted crank arm, a crank engaging means secured rigidly to said friction disc and received slidably and pivotably by said crank arm, resilient means urging said crank engaging means toward the axis of rotation of said crank arm, and means for driving said crank arm at a predetermined angular velocity greater than the velocity at which said load tends to precess naturally, so that said crank arm causes said mass to precess and cause the center of gravity of said mass to coincide with the axis of rotation of said crank arm and axis of rotation of said drive shaft.

2. An automatic balancing drive means, which comprises a pivotably and rotatably mounted substantially horizontal arbor, a rotatably mounted mass supported by said arbor, means for rotating said arbor and said mass at a predetermined angular velocity, a friction disc assembly secured rigidly to said arbor, which comprises a housing, a friction disc secured slidably in said housing, means urging resiliently said disc against said housing for preventing relative sliding motion therebetween resulting solely from the gravitational forces on said arbor and said mass, and means for preventing relative rotational movement between said arbor and said urging means, a slotted crank arm, a crank pin secured rigidly to said friction disc and mounted slidably in said crank arm, and means for rotating said crank arm at a predetermined angular velocity greater than the velocity at which said arbor tends to precess naturally, so that the various elements of the drive means cooperate to cause the center of gravity of said mass and said arbor to coincide with the axis of rotation of the crank arm.

3. An automatic balancing drive means, which comprises a pivotably and rotatably mounted arbor, a rotatably mounted mass supported by said arbor, means for rotating said arbor and said mas, a friction disc secured to said arbor, a slotted crank arm, a crank engaging member secured rigidly to said friction disc and mounted slidably in said crank arm, and means for rotating said crank arm at a predetermined angular velocity greater than the velocity at which said arbor tends to precess naturally, so that the various elements of the drive means cooperate to cause the center of gravity of said mass and said arbor to coincide with the axis of rotation of the crank arm.

4. Automatic balancing drive means for an arbor, which comprises a pivotably and rotatably mounted arbor, a mass supported by and rotated with said arbor, a flexible coupling secured to one end of said arbor, means for driving said flexible coupling at an angular velocity, a segmental, spherically shaped friction disc secured slidably to the opposing end of said arbor and having a center of curvature which coincides with the pivotal center of said arbor, a slotted crank arm, a crank engaging member secured rigidly to said friction disc and received slidably and pivotably by said crank arm, resilient means urging said crank engaging member toward the axis of rotation of said crank arm, and means for driving said crank arm at a predetermined angular velocity greater than the velocity at which said arbor tends to precess naturally, so that the various elements of said drive means cooperate to cause the center of gravity of said arbor and said mass to coincide with the axis of rotation of said crank arm and the axis of rotation of said means for driving said flexible coupling.

5. Automatic balancing drive means for an arbor, which comprises a pivotably and rotatably mounted horizontal arbor, a rotatably mounted mass supported by said arbor, a flexible coupling supporting one end of said arbor, means for driving said flexible coupling at an angular velocity, a segmental, spherically shaped friction disc secured slidably to said arbor and having a center of curvature which coincides with the pivotal center of said arbor, a slotted crank arm, a crank engaging member secured rigidly to said friction disc and received slidably and pivotably by said crank arm, resilient means urging said crank engaging member toward the axis of rotation of said crank arm, and means for driving said crank arm at a predetermined angular velocity greater than the velocity at which said arbor tends to precess naturally, so that the various elements cooperate to cause the center of gravity of said arbor and said mass to coincide with the axis of rotation of said crank arm and the axis of rotation of said means for driving said flexible coupling.

6. Automatic balancing drive means for an arbor, which comprises a pivotably and rotatably mounted arbor, a rotatably mounted mass supported by said arbor, a flexible coupling supporting one end of said arbor, means for driving said flexible coupling at an angular velocity, a friction disc secured slidably to said arbor, a slotted crank arm, a crank engaging member secured rigidly to said friction disc and received slidably and pivotably by said crank arm, resilient means urging said crank engaging member toward the axis of rotation of said crank arm, and means for driving said crank arm at a predetermined angular velocity greater than the velocity at which said arbor tends to precess naturally, so that the various elements cooperate to cause the center of gravity of said arbor and said mass to coincide with the axis of rotation of said crank arm and the axis of rotation of said means for driving said flexible coupling.

7. An automatic balancing drive means, which comprises a pivotably and rotatably mounted arbor, a rotatably mounted mass supported by said arbor, means for rotating said arbor and said mass at an angular velocity, a friction disc secured rigidly to said arbor, a slotted crank arm, a crank pin secured slidably to said friction disc and mounted slidably in said crank arm, means for preventing relative rotational movement between said disc and said crank pin, and means for rotating said crank arm at a predetermined angular velocity greater than the velocity at which said arbor tends to precess naturally, so that the various elements of the drive means cooperate to cause the axis of rotation of said crank pin to coincide with the axis of revolution of said crank arm and the center of gravity of said mass and said arbor to coincide with the axis of rotation of the crank arm.

8. An automatic balancing drive means, which comprises a pivotably and rotatably mounted arbor, a rotatably mounted mass supported by said arbor, means for rotating said arbor and said mass at a predetermined angular velocity, a friction disc assembly secured rigidly to said arbor, which comprises a housing, a segmental spherically shaped friction disc secured slidably in said housing and having a center of curvature which coincides with the pivotal axis of said arbor, means urging resiliently said disc against said housing, and means for preventing relative rotational movement between said arbor and said urging means, a slotted crank arm, a crank engaging member secured rigidly to said friction disc and mounted slidably in said crank arm, and means for rotating said crank arm at a predetermined angular velocity greater than the velocity at which said arbor tends to precess naturally, so that the various elements of the drive means cooperate to cause the center of gravity of said mass and said arbor to coincide with the axis of rotation of the crank arm.

References Cited in the file of this patent
UNITED STATES PATENTS

| | | |
|---|---|---|
| 2,144,064 | Johnson | Jan. 17, 1939 |
| 2,396,105 | Kirby | Mar. 5, 1946 |
| 2,533,722 | De Remer | Dec. 12, 1950 |
| 2,838,954 | Higley | June 17, 1958 |